United States Patent
Hudnall

(12) 
(10) Patent No.: US 6,325,121 B1
(45) Date of Patent: Dec. 4, 2001

(54) SIDE VIEW MIRROR COVER

(76) Inventor: Shea D. Hudnall, 875 William Blvd., Apartment 1212, Ridgeland, MS (US) 39157-1526

(*) Notice: Subject to any disclaimer, the term of this patent is extended or adjusted under 35 U.S.C. 154(b) by 0 days.

(21) Appl. No.: 09/680,307

(22) Filed: Oct. 6, 2000

Related U.S. Application Data

(60) Provisional application No. 60/176,488, filed on Jan. 18, 2000.

(51) Int. Cl.[7] ..................................................... B65D 65/02
(52) U.S. Cl. ........................................ 150/166; 296/95.1
(58) Field of Search .................................... 150/166, 168; 296/136, 95.1; 359/511; 160/370.21; D12/403

(56) References Cited

U.S. PATENT DOCUMENTS

| | | |
|---|---|---|
| D. 335,646 | 5/1993 | Silzer . |
| D. 375,927 | 11/1996 | Quintana et al. . |
| D. 379,034 * | 5/1997 | DeSatnick .............................. D3/299 |
| D. 390,529 | 2/1998 | Adams et al. . |
| 777,983 * | 12/1904 | Tompkins .............................. 150/166 |
| 1,409,666 * | 3/1922 | Calise .................................... 362/512 |
| 3,132,201 | 5/1964 | Bertell et al. . |
| 4,834,157 | 5/1989 | Smith . |
| 5,115,848 | 5/1992 | Malone . |
| 5,133,141 | 7/1992 | Bane . |
| 5,161,849 * | 11/1992 | Holland, Jr. ........................ 150/166 |
| 5,421,628 | 6/1995 | Nahm . |

FOREIGN PATENT DOCUMENTS 55-44078   9/1978   (JP) .

* cited by examiner

*Primary Examiner*—Allan N. Shoap
*Assistant Examiner*—Tri M. Mai
(74) *Attorney, Agent, or Firm*—Richard C. Litman

(57) ABSTRACT

A side view mirror cover is disclosed. The mirror cover includes a bonnet-like cover portion designed to conform to the exterior shape of the side view mirror housing. An elastic gather is provided along the open rear of the cover. A first pair of securement straps are provided for bringing together the ends of the elastic gather. A separate securement is provided for the open base of the cover about the stem attaching the mirror housing to the vehicle.

4 Claims, 11 Drawing Sheets

SIDE VIEW MIRROR COVER

CROSS-REFERENCE TO RELATED APPLICATION

This application claims the benefit of U.S. Provisional Patent Application Ser. No. 60/176,488, filed Jan. 18, 2000.

BACKGROUND OF THE INVENTION

1. Field of the Invention

The present invention relates to a protective cover for the side view mirror of an automobile.

2. Description of Related Art

During every day driving, a great deal of foreign matter such as road grime, tar, rocks, and insects are thrown up against the frontal surfaces of automobiles. This foreign matter often strikes the frontal areas of the vehicle at great speed and with great force and causes damage to the vehicle's body panels and finish. The areas that are particularly vulnerable to this type of damage include the front grille, the front bumper, the front portion of the hood, the front portions of the left and right quarter panels, and the fairings of the side view mirrors.

The so-called car bras which are used to cover the front of the car, protect portions of the front grille, the front bumper, the front portion of the hood, and the front portions of the left and right quarter panels. To protect the side view mirrors, covers which cover the mirror fairing have been proposed in the art. Examples of such mirror covers can be seen among the references cited below. However, none of the previously proposed mirror covers show the unique structural features of the mirror cover of the present invention.

U.S. Pat. No. 5,421,628, issued to Hyong K. Nahm on Jun. 6, 1995, is directed to a rain shield for protecting side view mirrors from rain water. The shield of Nahm has a visor-like extension which is intended to keep rain water from striking the surface of the reflecting surface of the mirror.

U.S. Pat. No. 5,133,141, issued to James K. Bane on Jul. 28, 1992, is directed to a rear view mirror cover having indicia such as a trademark, service mark, logo, emblem, or the like on the mirror cover's backside.

U.S. Pat. No. 5,115,848, issued to Jimmie L. Malone on May 26, 1992, is directed to bag-like enclosures for preventing the buildup of ice, frost, or snow on the surfaces of a vehicle's mirrors. The bag-like enclosures of Malone completely enclose the vehicle's mirrors.

U.S. Pat. No. 4,834,157, issued to Gerard Smith on May 30, 1989, is directed to a removable cover for protecting the housing of an exteriorly mounted mirror of a vehicle. The cover of Smith has an open side which allows the viewing of the mirror when the cover is applied to the mirror housing. An elastic seam extends along the rim of the open side. The ends of the elastic seam terminate at the straps used to secure the cover to the mirror housing. Thus, the elastic seam of the open side of the cover extends beyond the perimeter of the mirror's reflecting surface resulting in an open side that is longer than is necessary for viewing the mirror's reflective surface. The excessively long open side of the mirror cover of Smith results in a cover that can more easily slide off the mirror housing. Further, the excessively long open side of the mirror cover of Smith gives the mirror cover of Smith a less aesthetically pleasing appearance.

U.S. Pat. No. 3,132,201, issued to Paul Bertell et al. on May 5, 1964, is directed to a side view mirror for trucks. The side view mirror of Bertell has a shallow pan-like sheet metal housing. Although the sheet metal housing affords protection to the mirror of Bertell, the sheet metal housing does not constitute a removable, flexible mirror housing cover.

U.S. Pat. No. Des. 390,529, issued to Kenneth Adams et al. on Feb. 10, 1998, shows a bag-like side view mirror cover which has a drawstring about its single opening.

U.S. Pat. No. Des. 375,927, issued to Ross Quintana et al. on Nov. 26, 1996, shows an air scoop for attachment to a mirror. The air scoop aides in defogging and defrosting the mirror.

U.S. Pat. No. Des. 335,646, issued to Elmar Solzer on May 18, 1993, shows a rigid automobile wind deflector designed to extend for the height of the driver's side window and to encase the side view mirror housing.

Japanese Published Patent Application Number 57-155133, by Riyouji Kawahara and published on Sep. 25, 1982, shows a visor-like device for attachment to a side view mirror. The visor-like device is intended to keep rain and snow from adhering to the reflective surface of the mirror.

Japanese Published Patent Application Number 55-44078, published on Mar. 28, 1980, shows a side view mirror that can be removably attached to the passenger side of an automobile.

None of the above inventions and patents, taken either singly or in combination, is seen to describe the instant invention as claimed.

SUMMARY OF THE INVENTION

The present invention is directed to a side view mirror cover intended to protect the side view mirror of a vehicle while giving an aesthetically pleasing appearance to the vehicle. The mirror cover includes a bonnet-like cover portion designed to conform to the exterior shape of the side view mirror housing. An elastic gather is provided along the open rear of the cover. A first pair of securement straps are provided for bringing together the ends of the elastic gather. A separate securement means is provided for securing the open base of the cover about the stem attaching the mirror housing to the vehicle.

Accordingly, it is a principal object of the invention to provide a cover which protects the side view mirror of a vehicle.

It is another object of the invention to provide a side view mirror cover that has an aesthetically pleasing appearance.

It is a further object of the invention to provide a side view mirror cover that has an elastic gather about the opening for the reflective surface of the mirror.

Still another object of the invention is to provide a side view mirror cover that has a first securement means for bringing together the ends of an elastic gather provided about the opening for the reflective surface of the mirror, and a second securement means for securing the open base of the mirror cover about the stem attaching the mirror housing to a vehicle.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
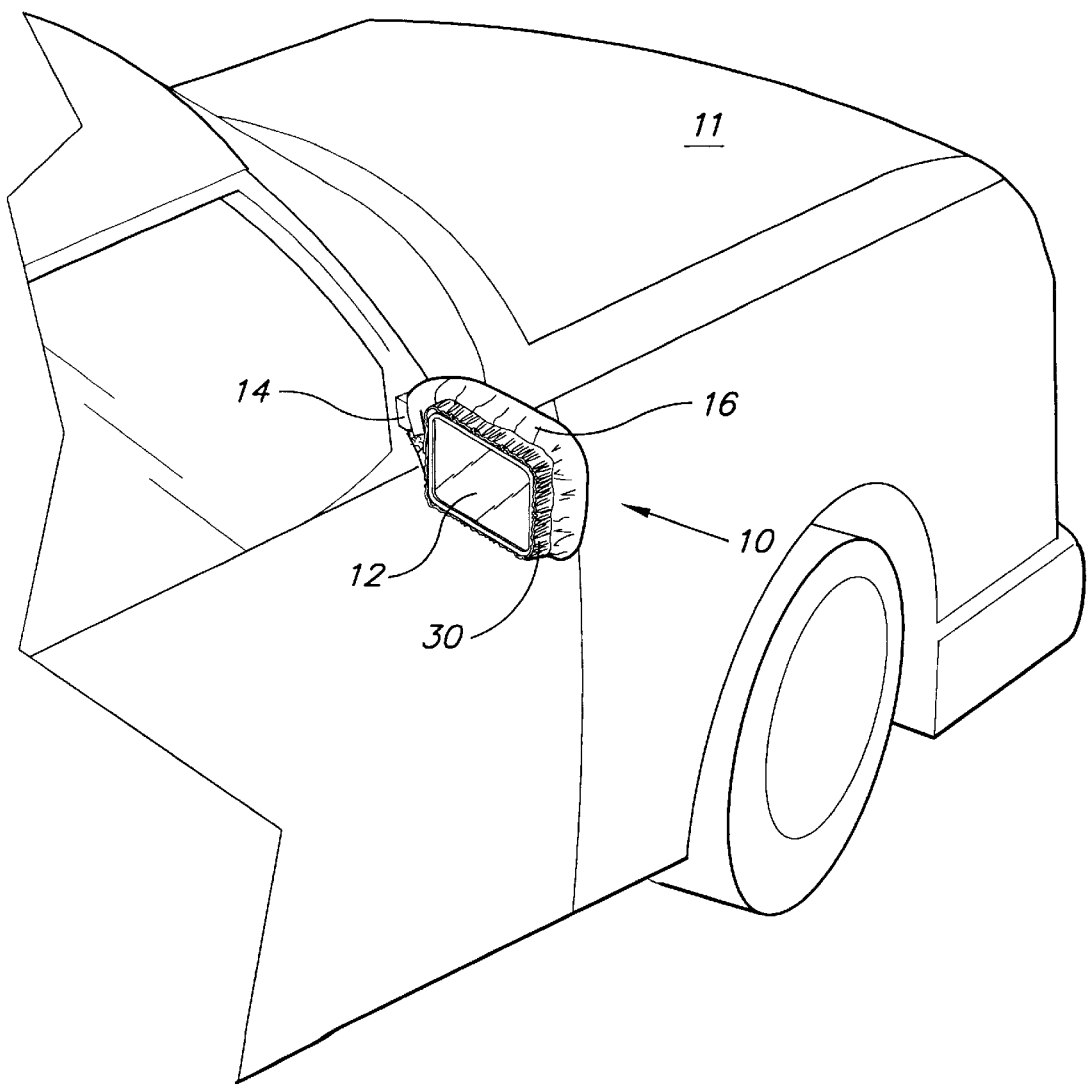
FIG. 1 is an environmental view of the first embodiment of the side view mirror cover according to the present invention.
Figure 2:
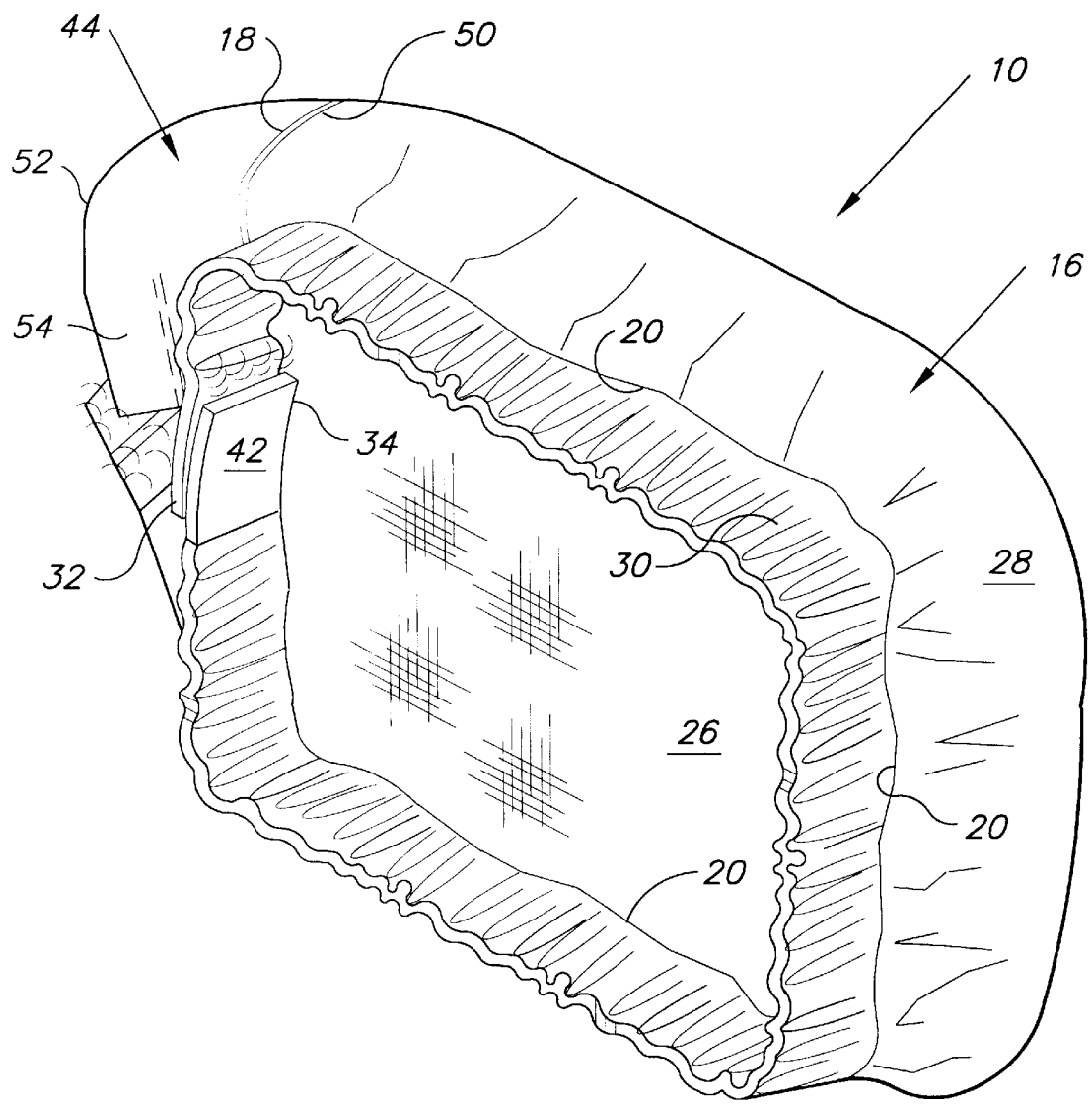
FIG. 2 is a perspective view of the first embodiment of the side view mirror cover according to the present invention, showing the fastening straps of the mirror cover in their closed configurations.
Figure 3:
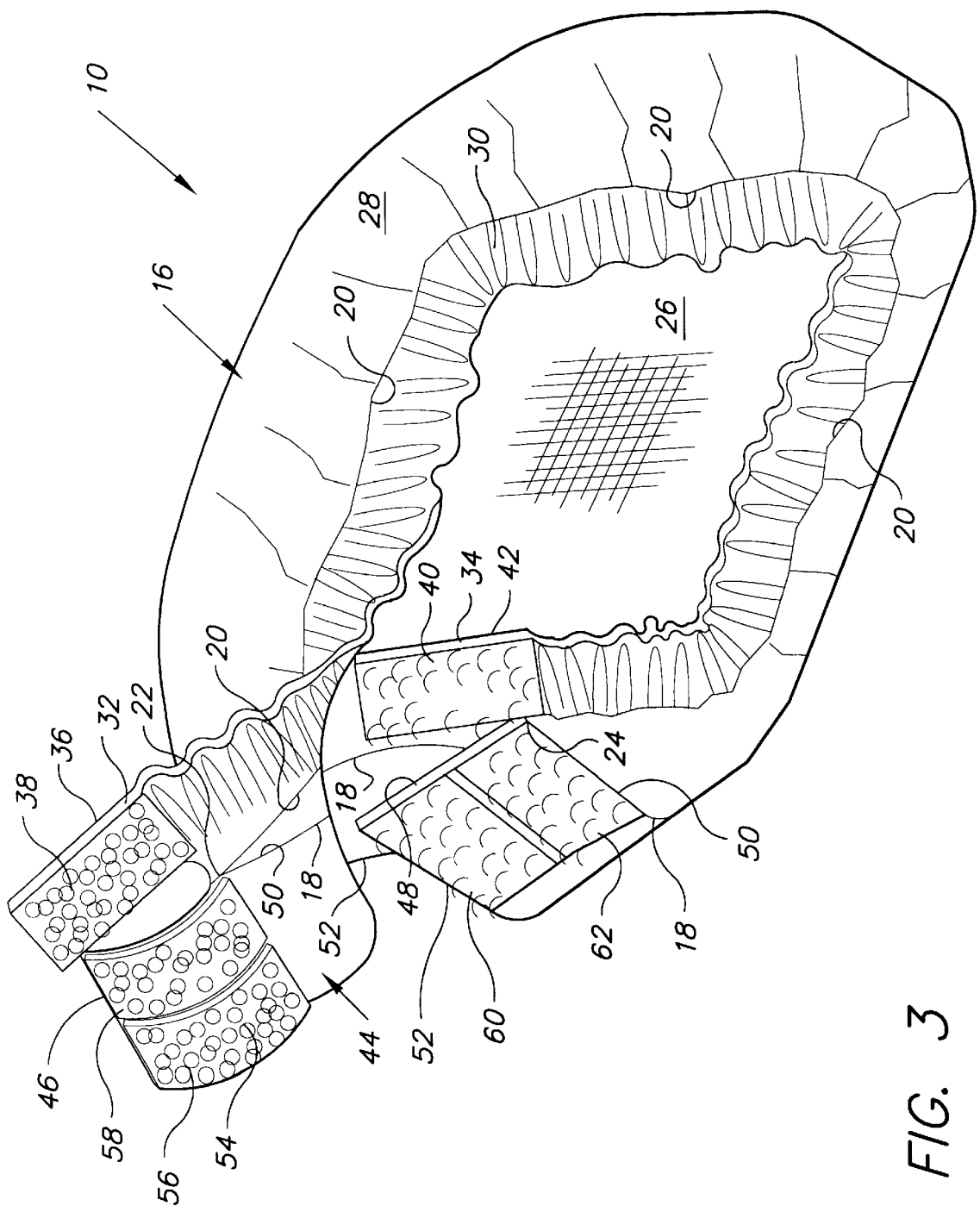
FIG. 3 is a perspective view of the first embodiment of the side view mirror cover according to the present invention, showing the fastening straps of the mirror cover in their open configurations.

Referring to FIGS. 1–3, the present invention is directed to a protective cover 10 for a side view mirror of an automobile 11. The side view mirrors of most modern passenger cars have a reflective mirror surface 12 and a fairing or mirror housing (not shown) which gives the side view mirror a more aerodynamically streamlined shape. The fairing has an open rear and the reflective surface 12 is positioned approximately within the open rear of the fairing. In a large number of vehicle models, the fairing is supported adjacent a side window of the automobile by a stem 14.

The protective cover 10 includes a flexible, bonnet-like covering portion 16 having a base opening rim 18 and a side opening rim 20. The base opening rim 18 has a first end 22 and a second end 24. The side opening rim 20 also has a first end and a second end. The first end of the side opening rim 20 is approximately coincident with the first end 22 of the base opening rim 18, and the second end of the side opening rim 20 is approximately coincident with the second end 24 of the base opening rim 18. The bonnet-like covering portion 16 is made of a flexible material and is adapted to cover and conform to at least the shape of the fairing when the protective cover 10 is applied to the side view mirror. The bonnet-like covering portion 16 has an interior surface 26 which lies adjacent the fairing of the side view mirror when the protective cover 10 is applied to the side view mirror. The bonnet-like covering portion 16 also has an exterior surface 28 which faces away from the fairing of the side view mirror and is exposed to the elements when the protective cover 10 is applied to the side view mirror.

An elastic gather 30 is attached to the bonnet-like covering portion 16 and extends along the length of the side opening rim 20. The elastic gather 30 has a first end located adjacent the first end 22 of the base opening rim 18 and a second end located adjacent the second end 24 of the base opening rim 18. The elastic gather is made of a tubular sleeve of flexible material which houses an elastic band. The material of the tubular sleeve is generally the same as the material of the bonnet-like cover portion 16. The ends of the elastic band are fixed, such as by sewing, to the ends of the tubular sleeve. The elastic band is of a shorter length than the tubular sleeve. Consequently, the tubular sleeve is bunched up along its length forming what is known as an elastic gather. The elastic gather is resilient in the sense that the gather tends to be restored to its original length after it has been stretched. The construction of this type of elastic gather is well known, therefore the details of the construction of the elastic gather 30 are not shown in the drawings. The elastic gather 30 is sewn to the bonnet-like cover portion 16 along a seam which is approximately coextensive with the side opening rim 20.

A first elongated strap 32 is attached to and extends from the first end of the elastic gather 30. The first elongated strap 32 has a top side 36 and an underside 38. The first elongated strap 32 has a first hook and loop fastener portion disposed on the underside 38 thereof. A second elongated strap 34 is attached to and extends from the second end of the elastic gather 30. The second elongated strap 34 has a top side 40 and an underside 42. The second elongated strap 34 has a second hook and loop fastener portion disposed on the top side 40 thereof. The second hook and loop fastener portion, disposed on the top side 40 of the second elongated strap 34, is engageable with the first hook and loop fastener portion disposed on the underside 38 of the first elongated strap 32. The elongated strips 32 and 34 are axially aligned with the first and second ends of the elastic gather 30, respectively.

A flexible rectangular strip 44 is attached to the bonnet-like cover portion 16. The rectangular strip 44 is preferably made of the same material as the bonnet-like cover portion 16. The rectangular strip 44 is circumscribed by a pair of parallel, short sides 46 and 48 and a pair of parallel, long sides 50 and 52. The corner of the rectangular strip, formed by the short side 48 and the long side 50, is positioned approximately adjacent the second end 24 of the base opening rim 18. The rectangular strip 44 is attached to the bonnet-like cover portion 16 along a seam which is approximately coextensive with the base opening rim 18. The seam along which the strip 44 is attached to the bonnet-like cover portion 16, is formed when the long side 50 of the rectangular strip 44 is sewn to the base opening rim 18 along the length of the base opening rim 18.

The long sides 50 and 52 of the strip 44 are longer than the base opening rim 18, such that a portion of the rectangular strip 44 extends beyond the first end 22 of the base opening rim 18. The portion of the rectangular strip 44 extending beyond the first end 22 of the base opening rim 18, forms a third strap 54. The third strap 54 has a top side and an underside. A pair of hook and loop fastener portions 56 and 58 are disposed on the underside of the third strap 54.

Another pair of hook and loop fastener portions 60 and 62 are disposed on the exterior or top surface of the strip 44. The exterior or top surface of the strip 44 is contiguous with the exterior surface of the bonnet-like covering portion 16. The pair of hook and loop fastener portions 60 and 62 are located proximate the second end 24 of the base opening rim 18. The pair of hook and loop fastener portions 60 and 62 are rectangular and have lengths which extend parallel to the base opening rim 18. The pair of hook and loop fastener portions 60 and 62 are placed side-by-side, with the hook and loop fastener portion 60 placed adjacent the long side 52 of the strip 44 and the hook and loop fastener portion 62 placed adjacent the base opening rim 18. One end of each of the hook and loop fastener portions 60 and 62 is positioned adjacent the short side 48 of the strip 44.

The pair of hook and loop fastener portions 56 and 58 are rectangular and have lengths which extend parallel to the long side 50 of the strip 44. The pair of hook and loop fastener portions 56 and 58 are placed side-by-side with one another. The hook and loop fastener portion 56 is placed adjacent the long side 52 of the strip 44 and the hook and loop fastener portion 58 is placed adjacent the long side 50 of the strip 44. One end of each of the hook and loop fastener portions 56 and 58 is positioned adjacent the short side 46 of the strip 44. The hook and loop fastener portions 56 and 58 are engageable with the hook and loop fastener portions 60 and 62.

The hook and loop fastener portions 56 and 58 are engaged to the hook and loop fastener portions 60 and 62 to secure the strip 44 around the stem 14 and form the base opening of the mirror cover 10. The hook and loop fastener portion fixed to the strap 32 is engaged to the hook and loop fastener portion fixed to the strap 34 to form a side opening through which the reflective surface 12 can be viewed. Further, the engagement of the hook and loop fastener portions on the straps 32 and 34 draws the elastic gather 30 snugly around the reflective surface 12 to completely frame the reflective surface 12 by the material of the cover 10 for a more aesthetically pleasing appearance. The elastic gather 30 in turn draws the bonnet-like cover portion tightly about the fairing of the side view mirror to minimize the impact of the cover 10 on the aerodynamics of the vehicle 11, when the protective cover 10 is applied to the side view mirror of the vehicle 11.

Figure 10:
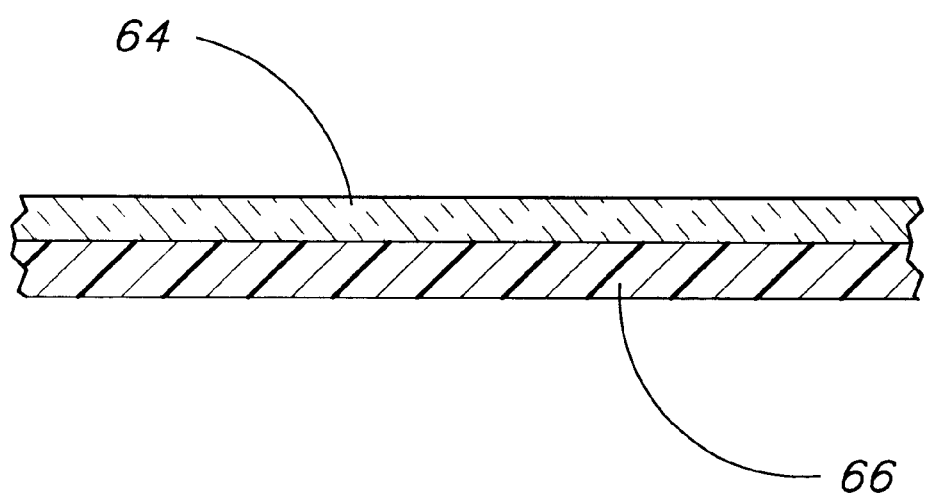
FIG. 10 is a fragmentary cross sectional view showing the laminated structure of the material of the side view mirror cover according to the present invention.

Referring to FIGS. 3 and 10, the protective cover 10 is preferably made of a flexible material which is a laminate made of a layer of a felt-like non-woven fabric 64 and a layer of material 66 selected from the group consisting of leather, vinyl, and other polymeric materials configured to simulate leather. The flexible material is applied such that the felt-like fabric lines the interior surface 26 and the leather or the leather-like material forms the exterior surface 28. The layer of leather or leather-like material 66 gives an aesthetically pleasing appearance to the mirror cover 10, in addition to being resistant to the elements and to the effects of foreign objects. The felt-like material is relatively soft and prevents abrasion of the finish of the side view mirror fairing. A woven fabric may be substituted for the felt-like material so long as it has the requisite softness.

Figure 4:
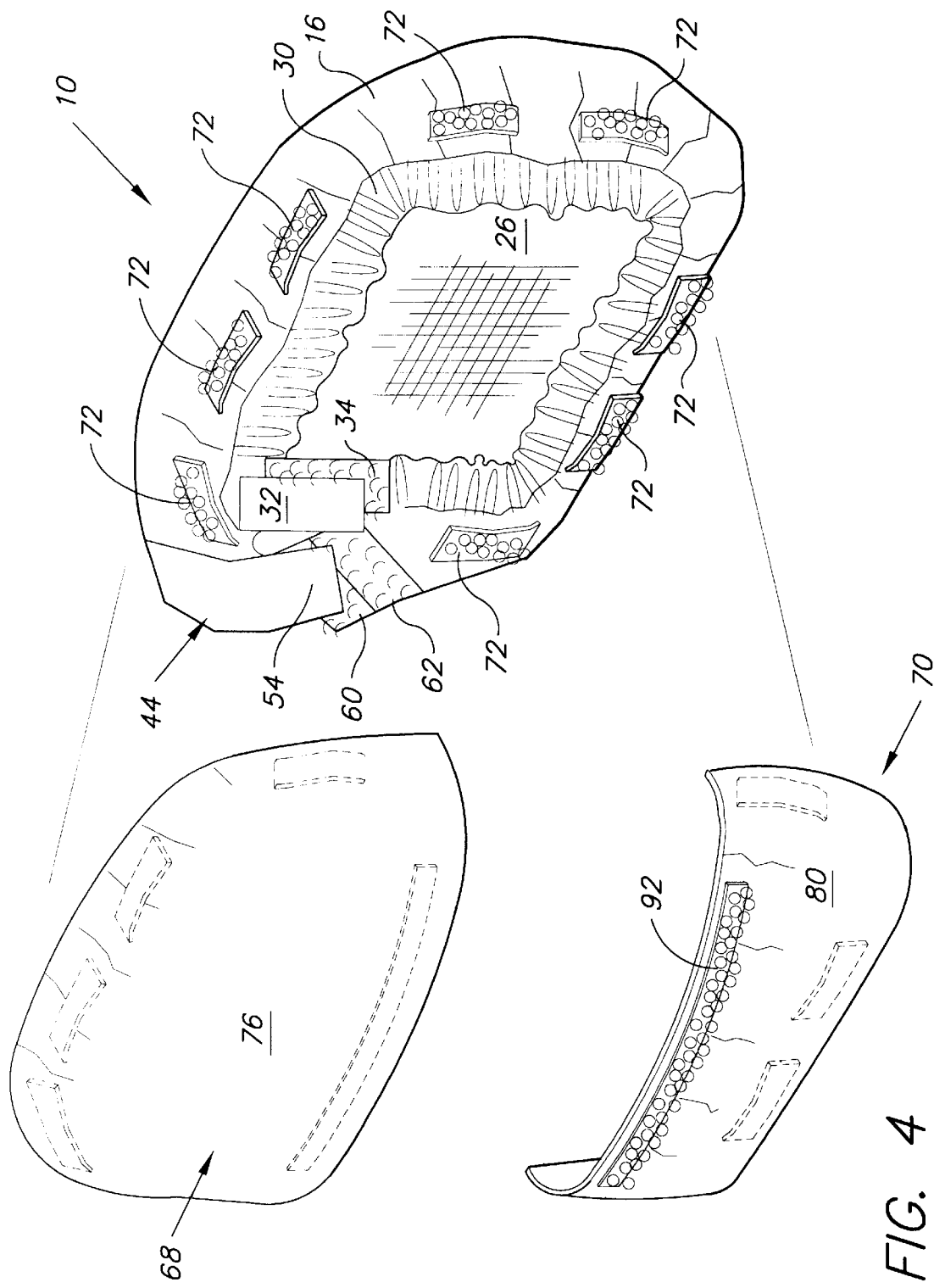
FIG. 4 is an exploded view showing the first embodiment of the side view mirror cover according to the present invention in conjunction with removable closure flaps for completely enclosing a side view mirror.
Figure 5A:
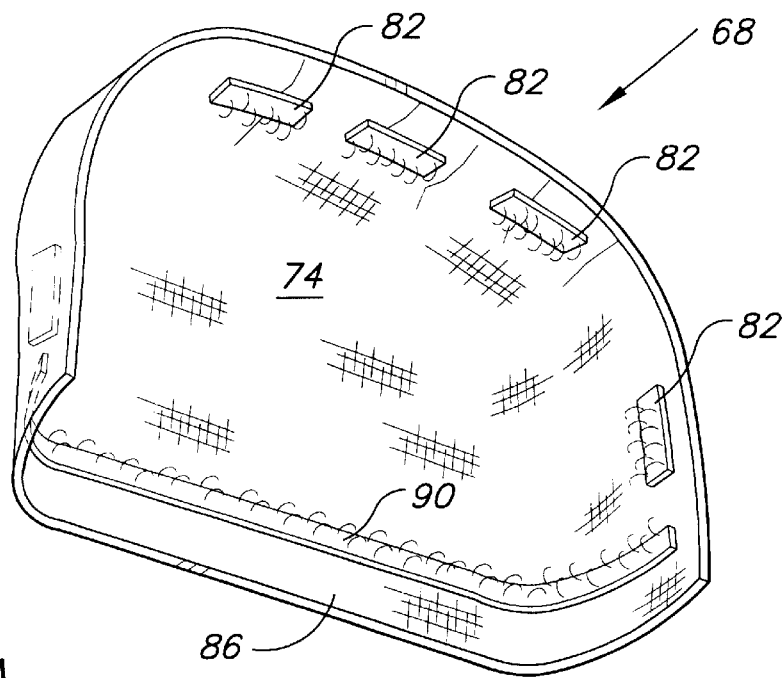
FIG. 5A is a perspective view showing the upper removable closure flap for use with the side view mirror cover according to the present invention.
Figure 5B:
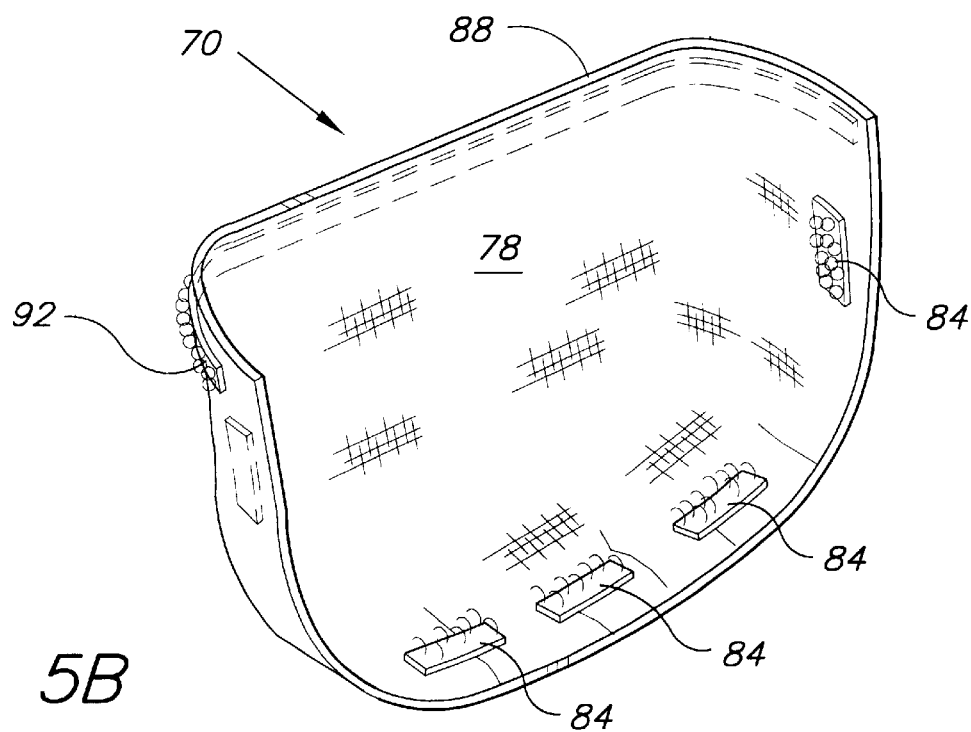
FIG. 5B is a perspective view showing the lower removable closure flap for use with the side view mirror cover according to the present invention.

Referring to FIGS. 4, 5A, and 5B, the protective cover 10 may optionally be provided with an upper closure flap 68 and a lower closure flap 70. The upper closure flap 68 has an interior surface 74 and an exterior surface 76. A plurality of hook and loop fastener portions 82 are provided on the interior surface of the upper flap 68. The lower closure flap 70 has an interior surface 78 and an exterior surface 80. A plurality of hook and loop fastener portions 84 are provided on the interior surface of the lower flap 70. A plurality of hook and loop fastener portions 72 are provided on the exterior surface of the bonnet-like covering portion 16. A number of the hook and loop fastener portions 72 are engaged by the hook and loop fastener portions 84 to hold the lower flap 70 in position over the lower half of the side opening of the cover 10 which is defined by the elastic gather 30. Similarly, a number of the hook and loop fastener portions 72 are engaged by the hook and loop fastener portions 82 to hold the upper flap 68 in position over the upper half of the side opening of the cover 10.

The lower edge 86 of the upper flap 68 overlies the upper edge 88 of the lower flap 70 when both flaps are applied to the cover 10. A hook and loop fastener portion 90, in the form of an elongated strip, is disposed on the interior surface 74 of the upper closure flap 68, in proximity to the lower edge 86 of the flap 68. Another hook and loop fastener portion 92, also in the form of an elongated strip, is disposed on the exterior surface of the lower closure flap 70. The hook and loop fastener portion 92 is located proximate the upper edge 88 of the lower flap 70. The hook and loop fastener portion 90 engages the hook and loop fastener portion 92 when the flaps 70 and 68 are applied to the mirror cover 10. The hook and loop fastener portions 90 and 92 help secure the flaps 70 and 68 in place. The flaps 70 and 68 are used to fully enclose the reflective surface 12 to protect the reflective surface from the elements when the vehicle 11 is parked.

Figure 6:
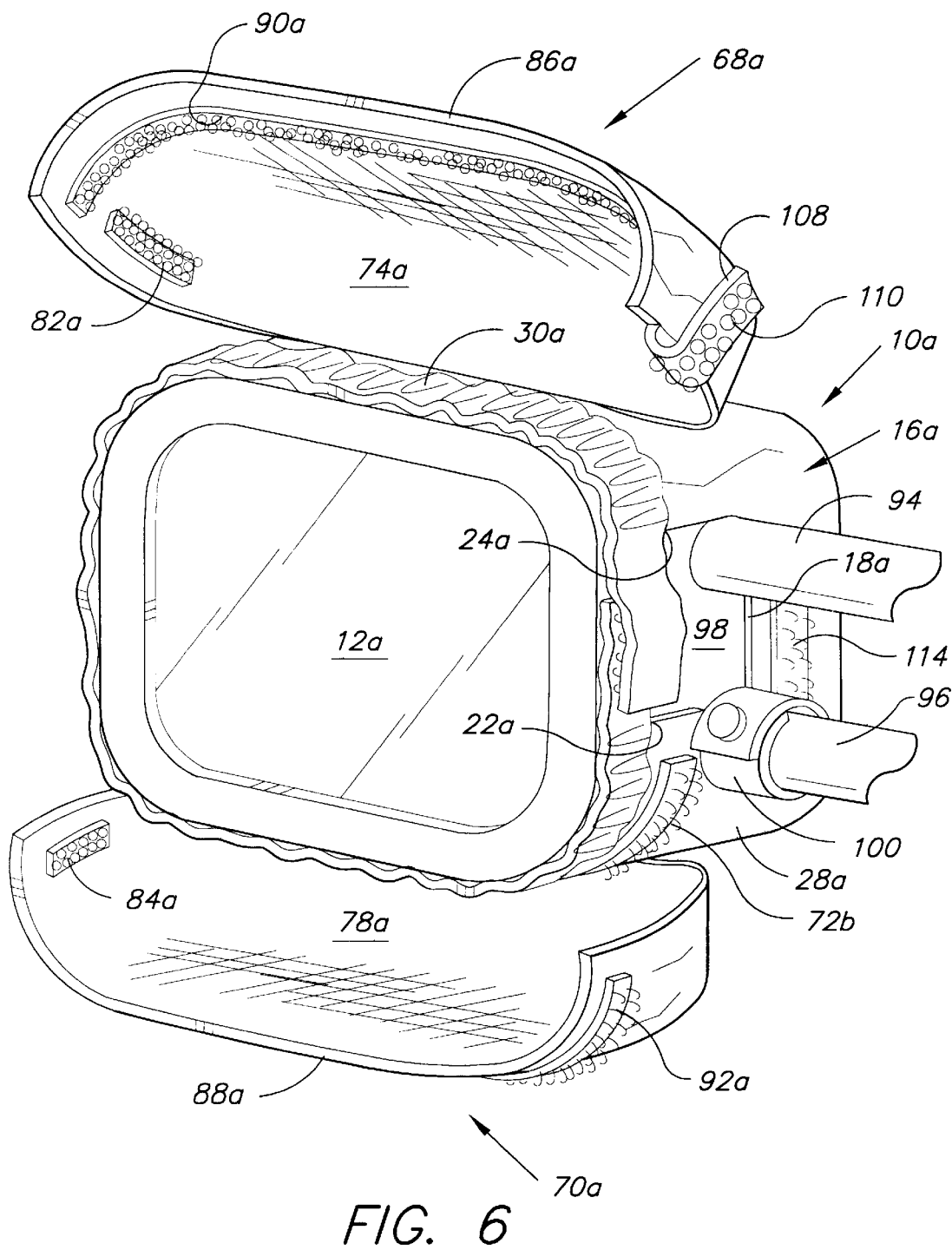
FIG. 6 is an environmental view of the second embodiment of the side view mirror cover according to the present invention.
Figure 11:
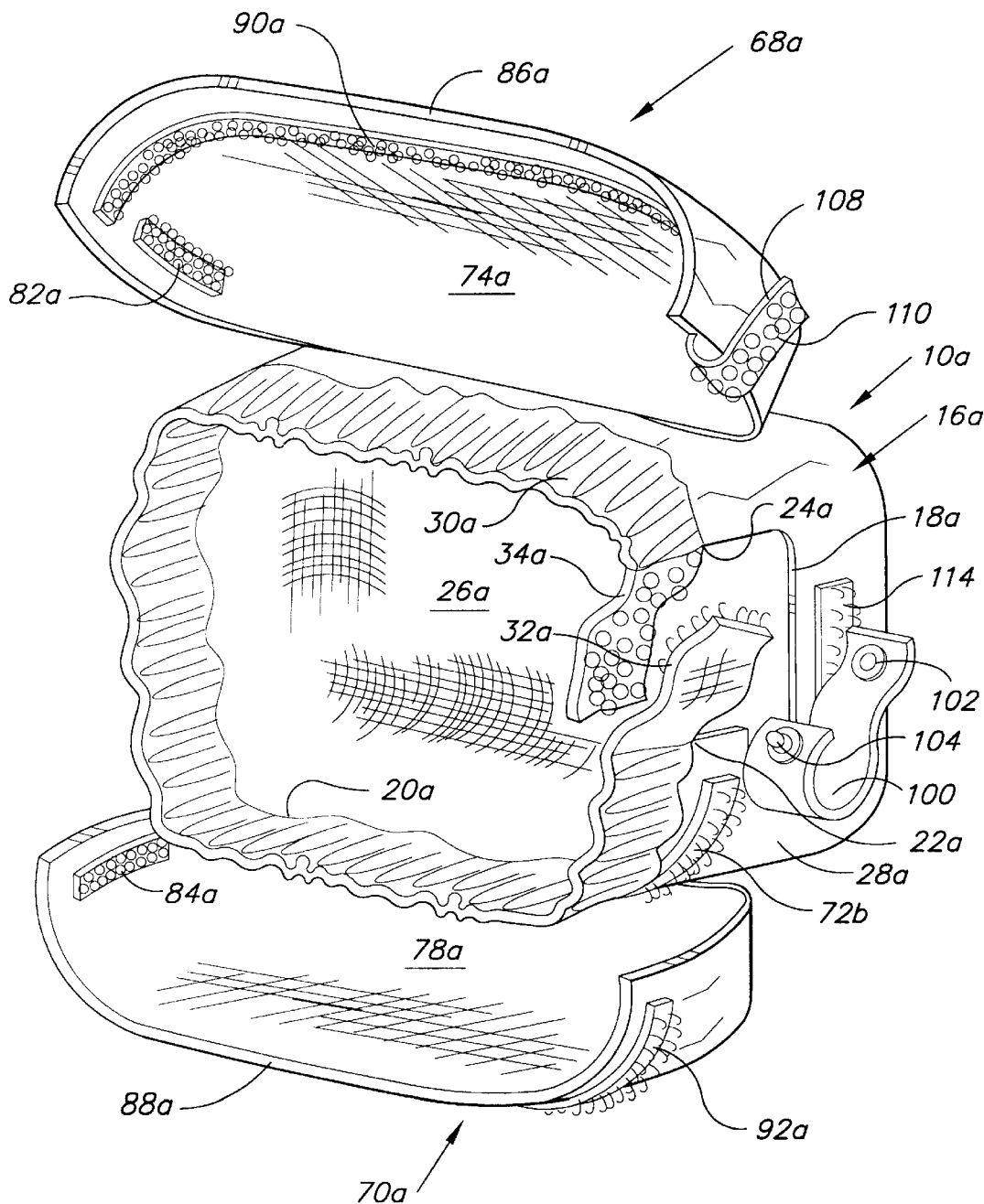
FIG. 11 is a perspective view of the second embodiment of the side view mirror cover according to the present invention, showing the securement strap and the closure flaps of the mirror cover in their open configurations.

Referring to FIGS. 6 and 11, a second embodiment of the mirror cover 10a can be seen. The cover 10a is for use with mirror housings, such as mirror housing 98, which are attached to the vehicle by twin stems 94 and 96. The protective cover 10a includes a flexible, bonnet-like covering portion 16a having a base opening rim 18a and a side opening rim 20a. The base opening rim 18a has a first end 22a and a second end 24a. The side opening rim 20a also has a first end and a second end. The first end of the side opening rim 20a is approximately coincident with the first end 22a of the base opening rim 18a, and the second end of the side opening rim 20a is approximately coincident with the second end 24a of the base opening rim 18a. The bonnet-like covering portion 16a is made of a flexible material and is adapted to cover and conform to at least the shape of the fairing or mirror housing 98 when the protective cover 10a is applied to a side view mirror. The bonnet-like covering portion 16a has an interior surface 26a which lies adjacent the fairing 98 of the side view mirror when the protective cover 10a is applied to a side view mirror. The bonnet-like covering portion 16a also has an exterior surface 28a which faces away from the fairing 98 and is exposed to the elements.

An elastic gather 30a is attached to the bonnet-like covering portion 16a and extends along the length of the side opening rim 20a. The elastic gather 30a has a first end located adjacent the first end 22a of the base opening rim 18a and a second end located adjacent the second end 24a of the base opening rim 18a. The elastic gather 30a is similar in construction to the elastic gather 30. The elastic gather 30a is sewn to the bonnet-like cover portion 16a along a seam which is approximately coextensive with the side opening rim 20a.

A first elongated strap 32a is attached to and extends from the first end of the elastic gather 30a. The first elongated strap 32a has a first hook and loop fastener portion on either its top side or its underside. A second elongated strap 34a is attached to and extends from the second end of the elastic gather 30a. The second elongated strap 34a has a second hook and loop fastener portion on either its top side or its underside, depending upon the location of the first hook and loop fastener portion on the strap 32a. The second hook and loop fastener portion, fixed to the strap 34a, is engageable with the first hook and loop fastener portion which is fixed to the strap 32a. The straps 32a and 34a are axially aligned with the ends of the elastic gather 30a.

A flexible rectangular strip 100 is attached to the bonnet-like cover portion 16a. The rectangular strip 100 is preferably made of the same material as the bonnet-like cover portion 16a. The rectangular strip 100 has two parallel long sides and two parallel short sides. A portion of one of the long sides of the strip 100 is sewn to a portion of the base opening rim 18a. The female portion 102 of a snap fastener is fixed to strip 100 near one end of the strip 100 and a male portion 104 of a snap fastener is fixed to the strip 100 near the other end of the strip 100. The female fastener portion 102 is engageable with the male fastener portion 104.

The female fastener portion 102 is engaged to the male fastener portion 104 to secure the strip 100 around the stem 96. The hook and loop fastener portion fixed to the strap 32a is engaged to the hook and loop fastener portion fixed to the strap 34a to form a side opening through which the reflective surface 12a can be viewed. Further, the engagement of the hook and loop fastener portions on the straps 32a and 34a draws the elastic gather 30a snugly around the reflective surface 12a to completely frame the reflective surface 12a by the material of the cover 10a for a more aesthetically pleasing appearance. The elastic gather 30a in turn draws the bonnet-like cover portion 16a tightly about the fairing 98 to minimize the impact of the cover 10a on the aerodynamics of the vehicle to which the mirror housing 98 is attached.

Figure 7:
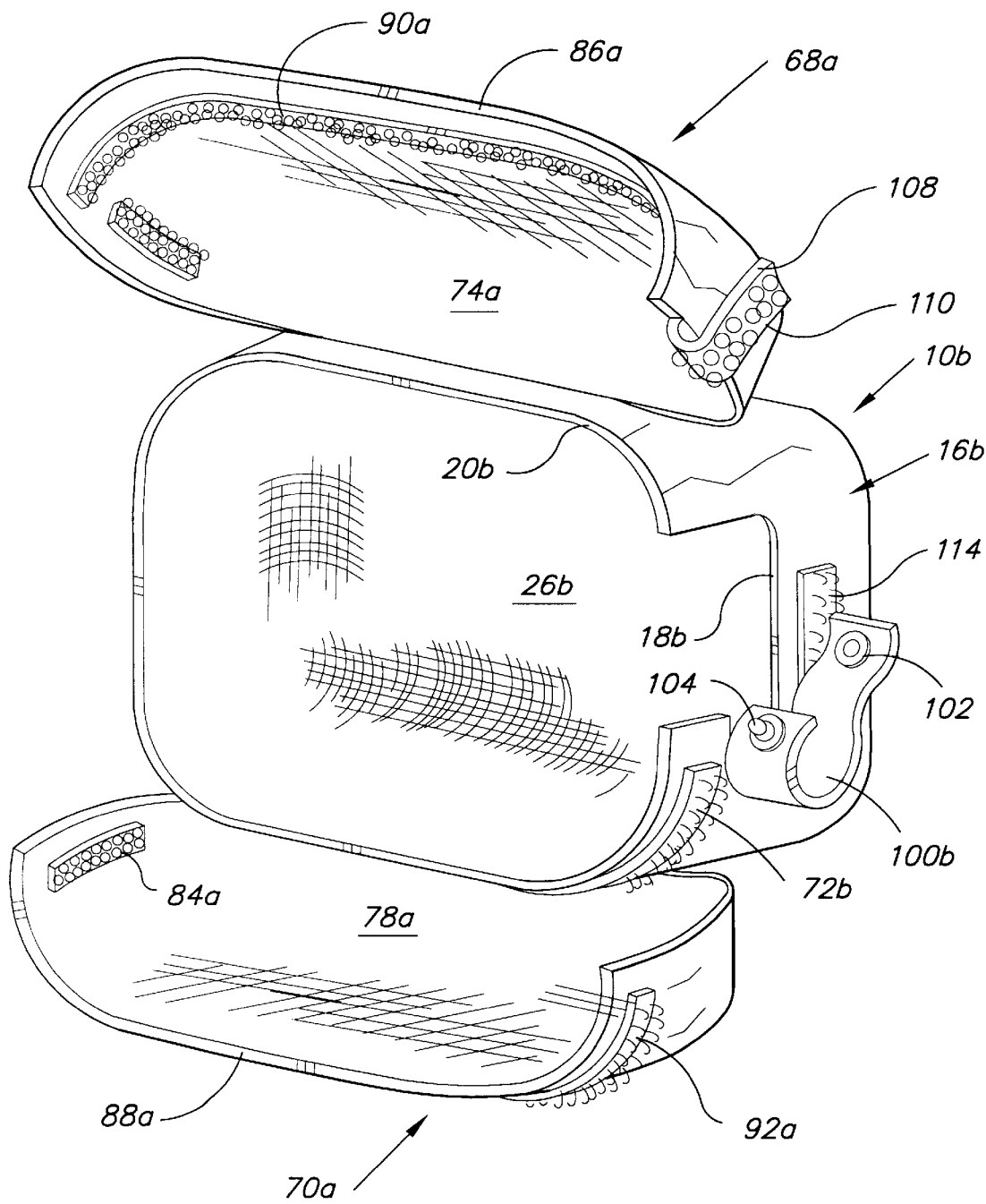
FIG. 7 is a front perspective view of the third embodiment of the side view mirror cover according to the present invention, showing the securement strap of the mirror cover in its open configuration.
Figure 8:
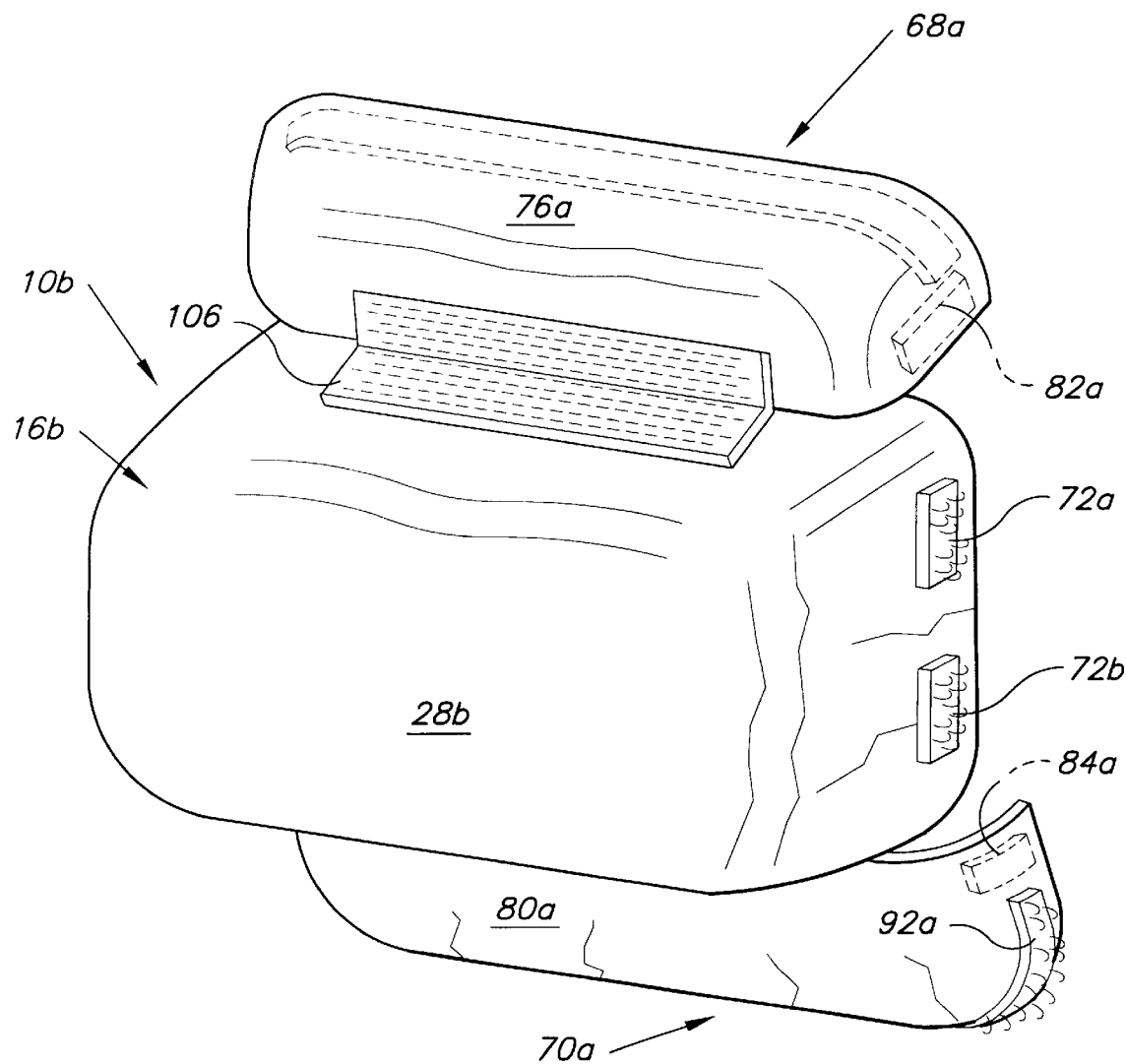
FIG. 8 is a top rear perspective view of the third embodiment of the side view mirror cover according to the present invention, showing the closure flaps in their open positions.
Figure 9:
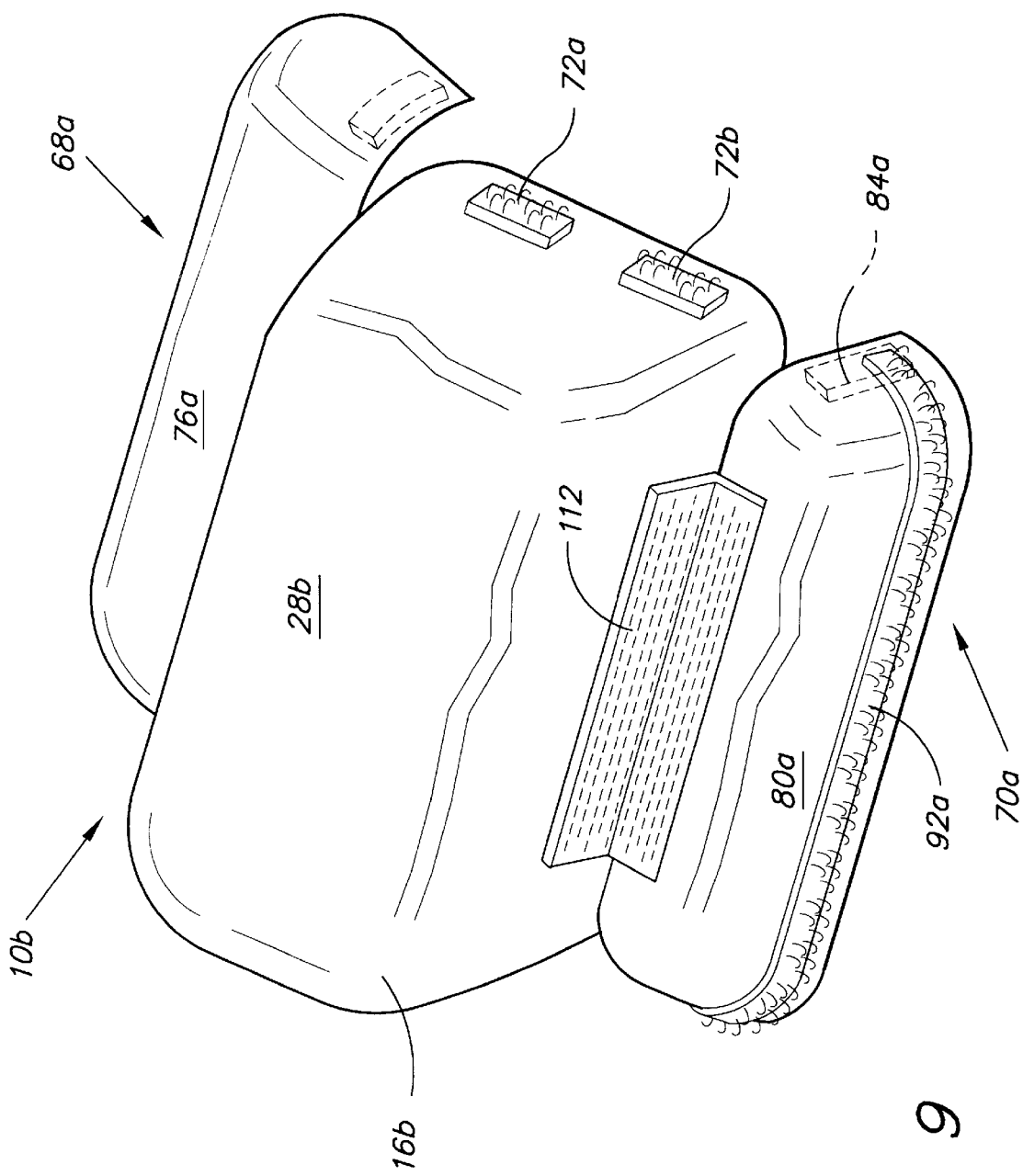
FIG. 9 is a bottom rear perspective view of the third embodiment of the side view mirror cover according to the present invention, showing the closure flaps in their open positions.

Referring to FIGS. 7–9, a third embodiment 10b of the side view mirror cover can be seen. The cover 10b is similar to the cover 10a with the main difference being that the elastic gather 30a and the straps 32a and 34a have been eliminated from the cover 10b. The cover 10b is also intended for use with mirror housings, such as mirror housing 98, which are attached to the vehicle by twin stems 94 and 96. The protective cover 10b includes a flexible, bonnet-like covering portion 16b having a base opening rim 18b and a side opening rim 20b. The ends of the base opening rim 18b are coincident with the ends of the side opening rim 20b. The bonnet-like covering portion 16b is made of a flexible material and is adapted to cover and conform to at least the shape of the fairing or mirror housing 98 when the protective cover 10b is applied to a side view mirror. The bonnet-like covering portion 16b has an interior surface 26b and an exterior surface 28b. The interior surface 26b lies adjacent the exterior of the mirror housing 98 when the cover 10b is applied to a side view mirror. The exterior surface 28b which faces away from the mirror housing 98, is exposed to the elements.

A flexible rectangular strip 100b is attached to the bonnet-like cover portion 16b. The rectangular strip 100b is identical to the rectangular strip 100. The rectangular strip 100b has two parallel long sides and two parallel short sides. A portion of one of the long sides of the strip 100b is sewn to a portion of the base opening rim 18b. The female portion 102 of a snap fastener is fixed to strip 100b near one end of the strip 100b and a male portion 104 of a snap fastener is fixed to the strip 100b near the other end of the strip 100b. The female fastener portion 102 is engaged to the male fastener portion 104 to secure the strip 100b around the stem 96.

FIGS. 6–9 and 11 also illustrate upper and lower closure flaps 68a and 70a that may be used with any of the covers 10, 10a, and 10b. The upper and lower closure flaps 68a and 70a are generally similar to the upper and lower closure flaps 68 and 70. The upper closure flap 68a has an interior surface 74a and an exterior surface 76a. At least one hook and loop fastener portion 82a is provided on the interior surface of the upper flap 68a. The upper flap 68a is attached to the bonnet-like cover portion 16, 16a, or 16b by a flexible strip of material 106 which is sewn to both the upper flap 68a and the bonnet-like cover portion. In addition, the upper flap 68a has a strap 108 attached thereto. The strap 108 carries a hook and loop fastener portion 110. The lower closure flap 70a has an interior surface 78a and an exterior surface 80a. A plurality of hook and loop fastener portions 84a are provided on the interior surface of the lower flap 70a. The lower flap 70a is attached to the bonnet-like cover portion 16, 16a, or 16b by a flexible strip of material 112 which is sewn to both the lower flap 70a and the bonnet-like cover portion. At least one hook and loop fastener portion 72a is provided on the exterior surface of the bonnet-like covering portion 16, 16a, or 16b. A hook and loop fastener portion 114 is provided on the exterior surface of the bonnet-like covering portion 16, 16a, or 16b near the base opening rim 18, 18a, or 18b. In addition, a plurality of hook and loop fastener portions 72b is provided on the lower half of the exterior surface of the bonnet-like covering portion 16, 16a, or 16b.

The lower edge 86a of the upper flap 68a overlies the upper edge 88a of the lower flap 70a when both flaps are in the closed position. A hook and loop fastener portion 90a, in the form of an elongated strip, is disposed on the interior surface 74a of the upper closure flap 68a, in proximity to the lower edge 86a of the flap 68a. Another hook and loop fastener portion 92a, also in the form of an elongated strip, is disposed on the exterior surface of the lower closure flap 70a. The hook and loop fastener portion 92a is located proximate the upper edge 88a of the lower flap 70a. The hook and loop fastener portions 84a engage the hook and loop fastener portions 72b to secure the lower flap 70a in the closed position. The hook and loop fastener portion 82a engages the hook and loop fastener portion 72a, the hook and loop fastener portion 110 engages the hook and loop fastener portion 114, and the hook and loop fastener portion 90a engages the hook and loop fastener portion 92a in order to secure the upper flap 68a in the closed position. In the closed position, the flaps 70a and 68a are used to fully enclose the reflective surface 12 or 12a to protect the reflective surface from the elements when the vehicle 11 is parked. The reflective surface 12 or 12a can be viewed when the flaps 68a and 70a are moved to their open positions, as illustrated in FIG. 6.

It is to be understood that the present invention is not limited to the embodiments described above, but encompasses any and all embodiments within the scope of the following claims.

I claim:

1. A protective cover for covering a side view mirror, the side view mirror having a reflective surface and a fairing which has a shape that gives a more aerodynamically streamlined character to the side view mirror, the fairing having an open rear and the reflective surface being positioned approximately within the open rear of the fairing, the fairing being supported adjacent a side window of an automobile by a stem, the protective cover comprising:

a flexible, bonnet-like covering portion having a base opening rim and a side opening rim, said base opening rim having a first end and a second end, said side opening rim having a first end and a second end, said first end of said side opening rim being coincident with said first end of said base opening rim, said second end of said side opening rim being coincident with said second end of said base opening rim, said bonnet-like covering portion being made of a flexible material and being adapted to cover and conform to at least the shape of the fairing when the protective cover is applied to the side view mirror, said bonnet-like covering portion having an interior surface which lies adjacent the fairing when the protective cover is applied to the side view mirror, and said bonnet-like covering portion having an exterior surface which faces away from the fairing and is exposed when the protective cover is applied to the side view mirror;

an elastic gather attached to said bonnet-like covering portion and extending along said side opening rim, said elastic gather having a first end and a second end, said first end of said elastic gather being positioned adjacent said first end of said side opening rim, and said second end of said elastic gather being positioned adjacent said second end of said side opening rim;

a first elongated strap attached to and extending from said first end of said elastic gather, said first elongated strap having a top side and an underside, said first elongated strap having a first hook and loop fastener portion disposed on said underside thereof;

a second elongated strap attached to and extending from said second end of said elastic gather, said second elongated strap having a top side and an underside, said second elongated strap having a second hook and loop fastener portion disposed on said top side thereof, said second hook and loop fastener portion being engageable with said first hook and loop fastener portion;

an elongated rectangular strip having a first long side, a second long side, a first short side, and a second short side, said elongated rectangular strip being attached to said bonnet-like cover portion along said base opening rim such that said first long side is adjacent said base opening rim and said second end of said base opening rim is adjacent a corner of said elongated rectangular strip formed by said first long side meeting said first short side, said first and second long sides being longer than said base opening rim such that said second short side and portions of said first and second long sides extending beyond said first end of said base opening rim define a third strap, said third strap having a top side and an underside, and said elongated rectangular strip having a top side and an underside;

a third hook and loop fastener portion disposed on said underside of said third strap; and a fourth hook and loop fastener portion disposed on said top side of said elongated rectangular strip proximate said first short side, said fourth hook and loop fastener portion being engageable with said third hook and loop fastener portion, whereby said third hook and loop fastener portion is engaged to said fourth hook and loop fastener portion to secure said base opening rim around the stem and form a base opening, said first hook and loop fastener portion is engaged to said second hook and loop fastener portion to form a side opening through which the reflective surface can be viewed, and said elastic gather draws said bonnet-like cover portion tightly about the fairing, when the protective cover is applied to the side view mirror.

2. The protective cover according to claim 1, wherein said flexible material is a laminate made of a layer of a felt-like non-woven fabric and a layer of material selected from the group consisting of leather and polymeric materials configured to simulate leather.

3. The protective cover according to claim 1, wherein said fourth hook and loop fastener portion is rectangular and has a pair of long sides and a pair of short sides, said fourth hook and loop fastener portion is positioned such that one of said pair of long sides lies adjacent said base opening rim and one of said pair of short sides lies adjacent said first short side of said elongated rectangular strip, the protective cover further comprising:

a fifth hook and loop fastener portion lying adjacent said fourth hook and loop fastener portion; and a sixth hook and loop fastener portion disposed on said underside of said third strap adjacent said third hook and loop fastener portion.

4. The protective cover according to claim 1, further comprising:

a fifth hook and loop fastener portion disposed on said exterior surface of said bonnet-like covering portion;

a sixth hook and loop fastener portion disposed on said exterior surface of said bonnet-like covering portion;

an upper closure flap having an interior surface and an exterior surface;

a seventh hook and loop fastener portion disposed on said interior surface of said upper closure flap;

an eighth hook and loop fastener portion disposed on said interior surface of said upper closure flap;

a lower closure flap having an interior surface and an exterior surface;

a ninth hook and loop fastener portion disposed on said interior surface of said lower closure flap; and a tenth hook and loop fastener portion disposed on said exterior surface of said lower closure flap, whereby said fifth hook and loop fastener portion and said sixth hook and loop fastener portion engage said seventh hook and loop fastener portion and said ninth hook and loop fastener portion, respectively, and said eighth hook and loop fastener portion engages said tenth hook and loop fastener portion to thereby fully enclose said side opening.

* * * * *